United States Patent
Lee et al.

(10) Patent No.: US 11,621,447 B2
(45) Date of Patent: Apr. 4, 2023

(54) SECONDARY BATTERY PACK INCLUDING CELL FRAME WITH COATING PREVENTION PART

(71) Applicant: LG CHEM, LTD., Seoul (KR)

(72) Inventors: Tae-Gyu Lee, Daejeon (KR); Bum Choi, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 0 days.

(21) Appl. No.: 16/761,723

(22) PCT Filed: Jul. 12, 2019

(86) PCT No.: PCT/KR2019/008645
§ 371 (c)(1),
(2) Date: May 5, 2020

(87) PCT Pub. No.: WO2020/022678
PCT Pub. Date: Jan. 30, 2020

(65) Prior Publication Data
US 2020/0259135 A1 Aug. 13, 2020

(30) Foreign Application Priority Data
Jul. 23, 2018 (KR) .......................... 10-2018-0085620

(51) Int. Cl.
*H01M 50/10* (2021.01)
*H01M 50/20* (2021.01)
(Continued)

(52) U.S. Cl.
CPC ..... *H01M 10/6235* (2015.04); *H01M 10/643* (2015.04); *H01M 10/653* (2015.04);
(Continued)

(58) Field of Classification Search
None
See application file for complete search history.

(56) References Cited

U.S. PATENT DOCUMENTS 6,132,900 A * 10/2000 Yoshizawa .......... H01M 50/169
429/57
2009/0202897 A1 8/2009 Kim et al.
(Continued)

FOREIGN PATENT DOCUMENTS

CN 203883050 U 10/2014
CN 204792950 U 11/2015
(Continued)

OTHER PUBLICATIONS

International Search Report issued in corresponding International Patent Application No. PCT/KR2019/008645, dated Oct. 30, 2019.
(Continued)

*Primary Examiner* — Lisa S Park
(74) *Attorney, Agent, or Firm* — Morgan, Lewis & Bockius LLP

(57) ABSTRACT

A secondary battery pack includes a plurality of cylindrical battery cells arranged in one direction and having electrode terminals respectively formed at one end and the other end thereof; a connection plate configured to electrically connect the plurality of cylindrical battery cells with each other; a pack housing having an inner space in which the plurality of cylindrical battery cells are mounted so that the electrode terminals are located in a horizontal direction; a thermally conductive resin interposed between an inner surface of the pack housing forming the inner space and an outer surface of the plurality of cylindrical battery cells; and a cell frame
(Continued)

configured to surround an upper portion of the plurality of cylindrical battery cells and at least a portion of outer surfaces of both ends of the plurality of cylindrical battery cells at which the electrode terminals are formed, the cell frame having an opening through which the electrode terminals are exposed out, the cell frame having a coating prevention part formed to protrude outward from at least a portion of a rim of the opening.

13 Claims, 11 Drawing Sheets

(51) Int. Cl.

| | |
|---|---|
| *H01M 10/6235* | (2014.01) |
| *H01M 10/643* | (2014.01) |
| *H01M 10/653* | (2014.01) |
| *H01M 50/213* | (2021.01) |
| *H01M 50/342* | (2021.01) |
| *H01M 50/503* | (2021.01) |
| *H01M 50/271* | (2021.01) |
| *H01M 50/227* | (2021.01) |
| *H01M 50/505* | (2021.01) |
| *H01M 50/522* | (2021.01) |

(52) U.S. Cl.
CPC ..... *H01M 50/213* (2021.01); *H01M 50/3425* (2021.01); *H01M 50/503* (2021.01); *H01M 50/227* (2021.01); *H01M 50/271* (2021.01); *H01M 50/505* (2021.01); *H01M 50/522* (2021.01); *H01M 2220/30* (2013.01)

(56) References Cited

U.S. PATENT DOCUMENTS

| | | |
|---|---|---|
| 2010/0136413 A1 | 6/2010 | Hermann et al. |
| 2011/0090614 A1 | 4/2011 | Guerin et al. |
| 2011/0165446 A1 | 7/2011 | Hermann |
| 2017/0301905 A1* | 10/2017 | Takeda .............. H01M 10/0525 |
| 2018/0316071 A1* | 11/2018 | Newman ................ H01G 11/18 |
| 2019/0372182 A1* | 12/2019 | Takayasu .................. B25F 5/02 |
| 2021/0167439 A1* | 6/2021 | Obasih ............. H01M 10/6551 |

FOREIGN PATENT DOCUMENTS

| | | |
|---|---|---|
| CN | 207489961 U | 6/2018 |
| JP | 2006-196277 A | 7/2006 |
| JP | 2010-225337 A | 10/2010 |
| JP | 4606139 B2 | 1/2011 |
| JP | 2011-508366 A | 3/2011 |
| JP | 2011-222459 A | 11/2011 |
| JP | 5110933 B2 | 12/2012 |
| JP | 2013-110080 A | 6/2013 |
| JP | 2014-86342 A | 5/2014 |
| JP | 2018-18759 A | 2/2018 |
| KR | 10-2009-0048863 A | 5/2009 |
| KR | 10-2010-0063166 A | 6/2010 |
| WO | 2016/178315 A1 | 11/2016 |

OTHER PUBLICATIONS

Extended European Search Report issued in corresponding European Patent Application No. 19841159.7, dated Feb. 10, 2021.
Office Action issued in corresponding Chinese Patent Application No. 19841159.7, dated Jan. 24, 2022. Note: 20170301905 cited therein is already of record.

* cited by examiner

SECONDARY BATTERY PACK INCLUDING CELL FRAME WITH COATING PREVENTION PART

TECHNICAL FIELD

The present disclosure relates to a secondary battery pack including a cell frame with a coating prevention part, and more particularly, to a secondary battery pack effectively improved in heat dissipation characteristics and safety.

The present application claims priority to Korean Patent Application No. 10-2018-0085620 filed on Jul. 23, 2018 in the Republic of Korea, the disclosures of which are incorporated herein by reference.

BACKGROUND ART

Secondary batteries currently commercialized include nickel cadmium batteries, nickel hydrogen batteries, nickel zinc batteries, lithium secondary batteries and so on. Among them, the lithium secondary batteries are more highlighted in comparison to nickel-based secondary batteries due to advantages such as free charging and discharging, caused by substantially no memory effect, very low self-discharge rate, and high energy density.

The secondary battery is highly applicable to various products and has electrical characteristics with high energy density. The secondary battery is applied not only to portable electronic devices but also to electric vehicles, hybrid electric vehicles, power storage devices, and the like, driven by an electric driving source.

The secondary battery is attracting attention as a new energy source for improving eco-friendliness and energy efficiency since the use of fossil fuels is significantly reduced and no by-product is generated during the use of energy.

A secondary battery pack applied to an electronic device may include a plurality of secondary batteries to obtain a high output, and the secondary batteries are electrically connected to each other. In addition, each secondary battery includes positive and negative electrode current collectors, a separator, an active material, an electrolyte, and the like as an electrode assembly, and may be repeatedly charged and discharged by an electrochemical reaction between the components.

Meanwhile, with the recent utilization as an energy storage source and the increased need for a large capacity structure, the demand for the secondary battery pack in which a plurality of secondary batteries are connected in series and/or in parallel is increasing.

Since the secondary battery pack is manufactured so that a plurality of secondary batteries are concentrated in a narrow space, it is important to easily dissipate heat generated from each secondary battery to the outside.

That is, the process of charging or discharging the secondary battery generates heat by an electrochemical reaction. Thus, if the heat of the secondary batteries generated during the charging and discharging process is not effectively removed, heat accumulation may occur. In addition, deterioration of the secondary battery is promoted, and in some cases, fire or explosion may occur.

In addition, if a plurality of secondary batteries are mounted in one secondary battery pack, the density of secondary batteries tends to be very high due to a limited space. Also, since the amount of heat generated from the secondary battery is proportional to the square of the current, the temperature of the secondary battery tends to rapidly increase during high rate discharge. In particular, a heat island phenomenon, in which heat is easily concentrated in an inner portion (a center portion) of the secondary battery array structure mounted inside the secondary battery pack, is easy to occur.

DISCLOSURE

Technical Problem

The present disclosure is designed to solve the problems of the related art, and therefore the present disclosure is directed to providing a secondary battery pack, which may effectively improve heat dissipation characteristics and safety.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a secondary battery pack, comprising:

a plurality of cylindrical battery cells arranged in one direction and having electrode terminals respectively formed at one end and the other end thereof;

a connection plate configured to electrically connect the plurality of cylindrical battery cells with each other;

a pack housing having an inner space in which the plurality of cylindrical battery cells are mounted so that the electrode terminals are located in a horizontal direction;

a thermally conductive resin interposed between an inner surface of the pack housing forming the inner space and an outer surface of the plurality of cylindrical battery cells; and a cell frame configured to surround an upper portion of the plurality of cylindrical battery cells and at least a portion of outer surfaces of both ends of the plurality of cylindrical battery cells at which the electrode terminals are formed, the cell frame having an opening through which the electrode terminals are exposed out, the cell frame having a coating prevention part formed to protrude outward from at least a portion of a rim of the opening.

Also, the connection plate may have a bent structure bent vertically or horizontally along an outer surface of the coating prevention part that protrudes outward.

Moreover, the coating prevention part may have a perforation hole into which a portion of the connection plate is inserted.

In addition, the coating prevention part may have a gas vent structure that is opened to discharge an air inside the coating prevention part to the outside when an air pressure of the inner space in which the electrode terminals are located is higher than a predetermined value.

Also, the cell frame may include a first frame configured to cover one side of the plurality of cylindrical battery cells with respect to a horizontal direction; and a second frame coupled to the other side of the first frame and configured to cover the other side of the plurality of cylindrical battery cells with respect to the horizontal direction.

Moreover, each of the first frame and the second frame may include a cover portion having an inner surface formed to surround the upper portion of the plurality of cylindrical battery cells and at least a portion of horizontal sides of the plurality of cylindrical battery cells; and an open portion formed therein so that a lower portion of the plurality of cylindrical battery cells is exposed out.

In addition, the thermally conductive resin may be coated to surround at least a lower portion of the plurality of cylindrical battery cells, among outer surfaces thereof.

Further, the first frame and the second frame may have a fixing hole perforated so that a portion of the thermally conductive resin is introduced and solidified therein.

Also, the pack housing may include an upper case configured to cover an upper portion of the cell frame; and a lower case coupled to a lower surface of the upper case and having a plurality of concave structures formed at the inner space to respectively correspond to outer surfaces of lower portions of the plurality of cylindrical battery cells.

Moreover, a plurality of convex portions protruding outward corresponding to the shape of the plurality of concave structures formed at the inner portion of the lower case may be formed at an outer surface of the lower case.

In addition, a lattice portion in which ribs protruding outward are formed to extend vertically and horizontally may be formed at the outer surface of the lower case where the plurality of convex portions are formed.

In another aspect of the present disclosure, there is also provided an electronic device, comprising the secondary battery pack.

In still another aspect of the present disclosure, there is also provided a power tool, comprising the secondary battery pack.

Advantageous Effects

According to an embodiment of the present disclosure, the secondary battery pack of the present disclosure may prevent a thermally conductive resin from being coated to the outer surface of the electrode terminal since a coating prevention part is formed at the rim of the opening through which the electrode terminal of the cell frame is exposed. Accordingly, in the present disclosure, since it is possible to prevent in advance that the safety vent structure is not operated by the thermally conductive resin, the safety of the secondary battery pack may be effectively improved.

Further, according to an embodiment of the present disclosure, a plurality of cylindrical battery cells may be electrically connected with each other by forming a bent structure shaped corresponding to the coating prevention part at a portion of the connection plate of the present disclosure. Moreover, since an avoiding hole is formed in the connection plate of the present disclosure so that the safety vent structure formed at the electrode terminal may operate normally, it is possible to ensure safety during abnormal operation of the secondary battery pack.

In addition, according to an embodiment of the present disclosure, if a perforation hole is formed so that a portion of the connection plate is inserted into the coating prevention part of the cell frame of the present disclosure, the connection plate may be firmly fixed to the outer surface of the cell frame, and the extended length of the connection plate to contact the electrode terminal may be minimized, thereby reducing the material cost.

Also, according to another embodiment of the present disclosure, since the cell frame of the present disclosure includes a gas vent structure formed at the coating prevention part, the gas discharged from the plurality of cylindrical battery cells may be properly discharged to the outside without being stagnated inside the coating prevention part of the cell frame. Accordingly, it is possible to prevent that the ignition or explosion is caused by the stagnant gas.

Moreover, according to another embodiment of the present disclosure, since a fixing hole is formed in the cell frame of the present disclosure, the bonding force between the thermally conductive resin and the cell frame may be enhanced. In addition, since the thermally conductive resin may increase the binding force among the cell frame, the plurality of cylindrical battery cells and the pack housing by means of the fixing hole, it is possible to increase the durability of the secondary battery pack further.

In addition, according to an embodiment of the present disclosure, since a concave structure is formed at the inner surface of the lower case of the present disclosure and a plurality of convex portions are formed at the outer surface of the lower case, the heat of the plurality of cylindrical battery cells may be absorbed by the concave structure formed inside the accommodation portion of the lower case, and the heat absorbed by the concave structure may be quickly transferred to the plurality of convex portions, thereby effectively dissipating the heat through the plurality of convex portions exposed to the air out of the pack housing. Accordingly, it is possible to greatly increase the cooling efficiency of the secondary battery pack.

Further, according to an embodiment of the present disclosure, since a lattice portion is formed at the outer surface where the convex portions of the lower case of the present disclosure are formed, the lattice portion may prevent the convex portions of the lower case from colliding with foreign substances, and it is possible to effectively increase the mechanical stiffness of the outer side where the convex portions of the lower case are formed.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
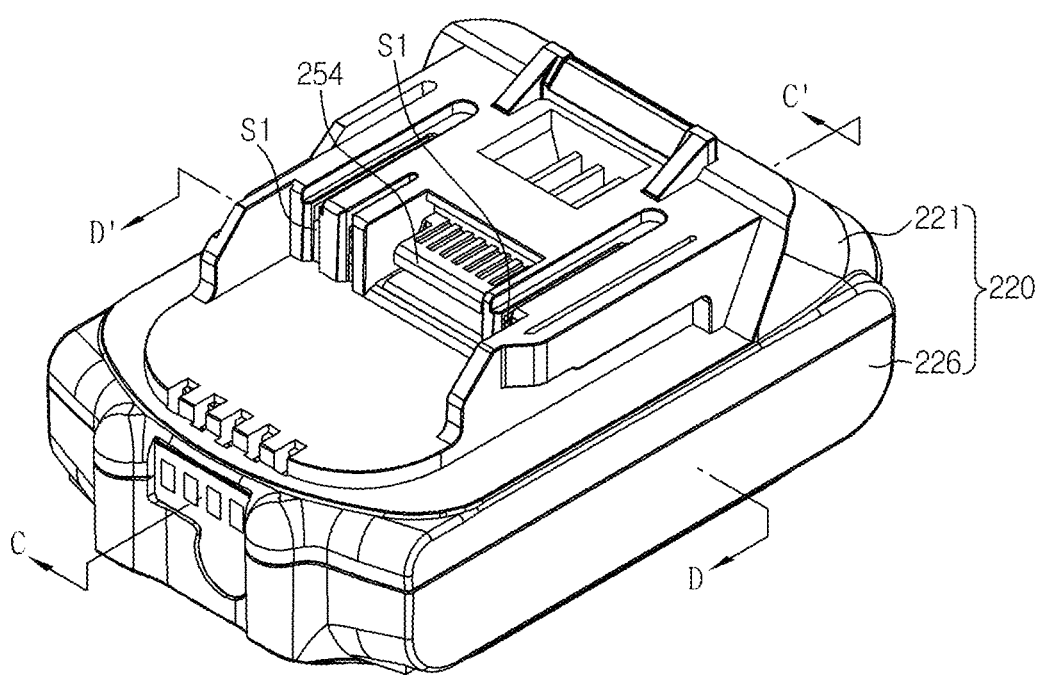
FIG. 1 is a perspective view schematically showing a secondary battery pack according to an embodiment of the present disclosure.
Figure 2:
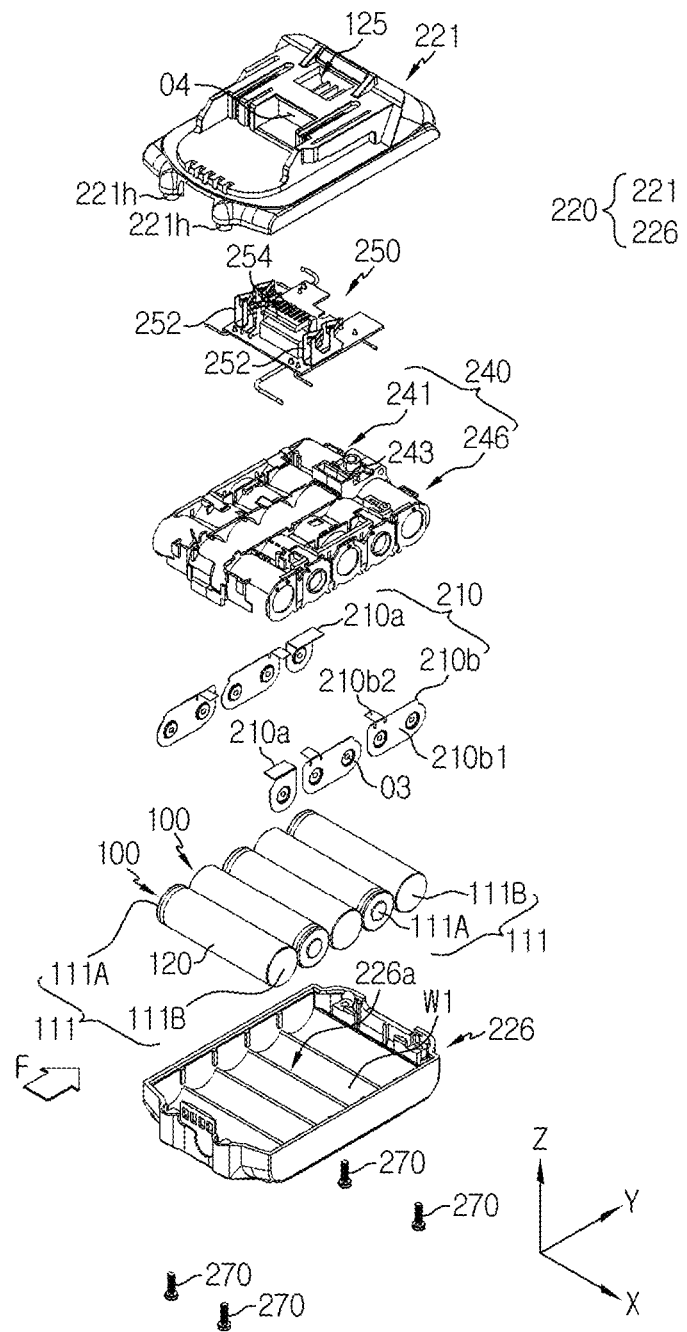
FIG. 2 is an exploded perspective view schematically showing the secondary battery pack according to an embodiment of the present disclosure.

FIG. 1 is a perspective view schematically showing a secondary battery pack according to an embodiment of the present disclosure. FIG. 2 is an exploded perspective view schematically showing the secondary battery pack according to an embodiment of the present disclosure. Also, FIG. 3 is a sectioned view schematically showing a part of a vertical section of a cylindrical battery cell of the secondary battery pack according to an embodiment of the present disclosure.

Figure 3:
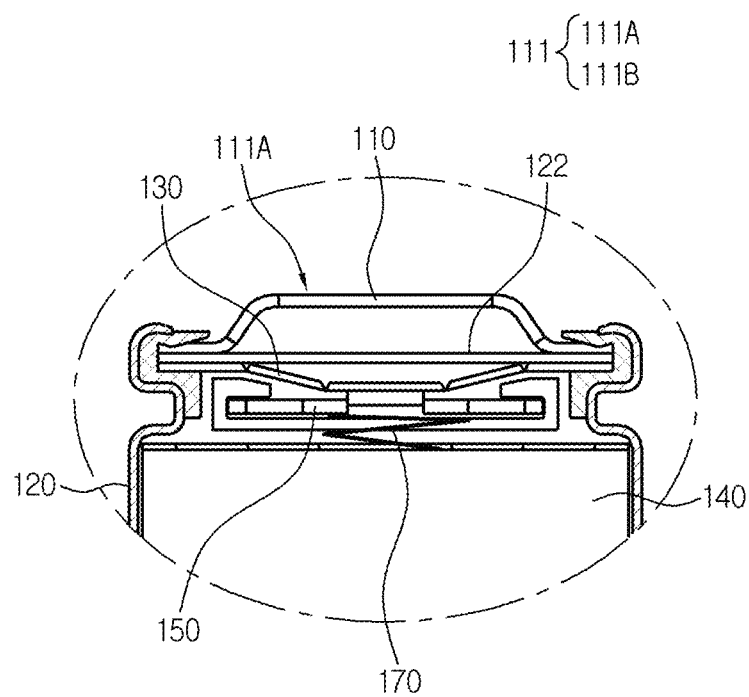
FIG. 3 is a sectioned view schematically showing a part of a vertical section of a cylindrical battery cell of the secondary battery pack according to an embodiment of the present disclosure.

Referring to FIGS. 1 to 3, a secondary battery pack 200 according to the present disclosure includes a plurality of cylindrical battery cells 100, a connection plate 210, a pack housing 220, and a cell frame 240.

Here, the cylindrical battery cell 100 may include a cylindrical battery can 120 and an electrode assembly 140 accommodated in the battery can 120.

Here, the battery can 120 may include a material with high electrical conductivity. For example, the battery can 120 may include aluminum, steel, or copper. In addition, electrode terminals 111 may be formed at both horizontal ends of the battery can 120.

Specifically, the electrode terminals 111 may include a first electrode terminal 111A and a second electrode terminal 111B having different electrical polarities from each other. In addition, when viewed in the F direction (shown in FIG. 2), the first electrode terminal 111A is formed at one horizontal end (a left end) of the battery can 120, and the second electrode terminal 111B may be formed at the other horizontal end (a right end) thereof.

Meanwhile, in this specification, the upper, lower, left and right directions are defined the case of viewed in the F direction unless there is particular notice.

Further, the electrode assembly 140 may be formed in a jelly-roll structure in a state where a separator is interposed between a positive electrode and a negative electrode. In addition, a positive electrode tab 170 may be attached to the positive electrode (not shown) so as to be connected to the first electrode terminal 111A at a top of the battery can 120. Moreover, a negative electrode tab (not shown) may be attached to the negative electrode (not shown) so as to be connected to the second electrode terminal 111B at a right end of the battery can 120.

For example, as shown in FIG. 2, the secondary battery pack 200 may include five cylindrical battery cells 100 arranged in one direction. In addition, the electrode terminals 111 of the five cylindrical battery cells 100 may be arranged such that electrode terminals 111 of different polarities are adjacent to each other. That is, among the electrode terminals 111 of the cylindrical battery cell 100 disposed at the foremost side, the first electrode terminal 111A may be located at the left end of the battery can 120, and the second electrode terminal 111B may be located at the right end of the battery can 120.

Referring to FIG. 3 again, the cylindrical battery cell 100 may include a top cap 110. In addition, the top cap 110 may have a protruding shape. Also, the top cap 110 may be used as the electrode terminal 111 of the cylindrical battery cell 100. In addition, the top cap 110 may be configured to be opened at least partially when the gas therein reaches a specific pressure or above.

In addition, the cylindrical battery cell 100 may have a safety element 122 (for example, a positive temperature coefficient (PTC) element) at a lower portion thereof. When the temperature inside the battery can 120 rises, the safety element 122 may greatly increase the battery resistance to block the current. Also, the cylindrical battery cell 100 may include a safety vent structure 130 configured to protrude downward in a normal state. However, when the pressure inside the battery rises, the safety vent structure 130 may protrude in one direction and be ruptured to exhaust gas.

Further, the cylindrical battery cell 100 may include a current interrupt device (CID) 150 having an upper one side coupled to the safety vent structure 130 and a lower one side connected to the positive electrode of the electrode assembly 140.

However, the secondary battery pack 200 according to the present disclosure is not limited to the cylindrical battery cell 100 described above, and various kinds of cylindrical battery cells 100 known at the time of filing this application may be employed.

Referring to FIG. 2 again, the connection plate 210 may be configured to contact the electrode terminals 111 of the plurality of cylindrical battery cells 100 to electrically connect the plurality of cylindrical battery cells 100 with each other. In other words, the connection plate 210 may be regarded as serving as a bus bar. For example, the connection plate 210 may include a metal material with high electrical conductivity. For example, the metal material may be an alloy including gold, aluminum, copper, nickel, or the like.

Specifically, the connection plate 210 may have one end in contact with the first electrode terminal 111A of one cylindrical battery cell 100 and the other end in contact with the second electrode terminal 111B of another cylindrical battery cell 100 such that the first electrode terminal 111A of one cylindrical battery cell 100 and the second electrode terminal 111B of the other cylindrical battery cell 100 are electrically connected with each other.

In addition, the connection plate 210 may have an extension 210b2 extending from one side end of a body 210b1 that is in contact with the electrode terminal 111 to transfer power to an external electronic device or to sense a voltage of the cylindrical battery cell 100. That is, the extension 210b2 may be electrically connected to an external input/output terminal 252 to transmit power to the outside or may be connected to a voltage sensing terminal of a battery management unit, explained later.

For example, as shown in FIG. 2, among six connection plates 210, the bodies 210b1 of four connection plates 210b may electrically connect the first electrode terminal 111A of one cylindrical battery cell 100 and the second electrode terminal 111B of another cylindrical battery cell 100. In addition, the four connection plates 210b may have an extension 210b2 extending from one side end of the body 210b1 so that the battery management unit, explained later, may sense a voltage.

Also, as shown in FIG. 2, the remaining two connection plates 210a may be set to be in electrical contact with the first electrode terminal 111A or the second electrode terminal 111B of one cylindrical battery cell 100. At this time, the two connection plates 210a may have an extension extending from one side end of the body to transfer power to the external electronic device, like the other connection plates 210b.

Moreover, though not shown in FIG. 2, when the plurality of cylindrical battery cells 100 are configured to be electrically connected in parallel, the connection plate 210 may electrically connect the first electrode terminal 111A of one cylindrical battery cell 100 and the first electrode terminal 111A of another cylindrical battery cell 100, or may electrically connect the second electrode terminal 111B of one cylindrical battery cell 100 and the second electrode terminal 111B of another cylindrical battery cell 100.

Meanwhile, the secondary battery pack 200 may include an external input/output terminal 252 configured to receive power from an external device or to supply power thereto. For example, the external input/output terminal 252 may be electrically connected to a battery management unit (BMU) that controls charging and discharging of the plurality of cylindrical battery cells 100 as explained in detail later. Specifically, the battery management unit 250 controls a switch element (not shown) to turn on/off according to the state of charge or discharge of a battery unit so that the battery is charged or discharged.

Meanwhile, the pack housing 220 may be configured in an integrated form, or may be configured by coupling the two members. Specifically, the pack housing 220 may include an upper case 221 and a lower case 226. The pack housing 220 may be made of an electrically insulating material. For example, the pack housing 220 may include polyethylene terephthalate or polyvinyl chloride.

For example, as shown in FIG. 2, the pack housing 220 may include an upper case 221 relatively located at an upper side and a lower case 226 coupled to a lower surface of the upper case 221. That is, the pack housing 220 may be configured by coupling the upper case 221 and the lower case 226 with each other.

In addition, an empty space may be formed inside the pack housing 220 to accommodate components such as the plurality of cylindrical battery cells 100, the cell frame 240, and the battery management unit 250.

Specifically, the pack housing 220 may have an inner space such that the plurality of cylindrical battery cells 100 are mounted in a state where the electrode terminals 111 are located in a horizontal direction (an x-axis direction). That is, the plurality of cylindrical battery cells 100 may be disposed such that the side portion of the battery can 120 in the vertical direction (the z-axis direction) is in contact with the inner surface of the pack housing 220.

In addition, an accommodation portion 226a having an empty space may be provided in the lower case 226 of the pack housing 220 to accommodate the cylindrical battery cells 100. For example, as shown in FIG. 2, the accommodation portion 226a having an empty space may be formed in the pack housing 220 to accommodate five cylindrical battery cells 100.

Further, an upper portion of the upper case 221 of the pack housing 220 may have an air input portion 125 in which at least one opening is formed to allow an external air to flow therein. For example, as shown in FIG. 2, the air input portion 125 may be formed at the upper portion of the pack housing 220 when viewed in the F direction.

Here, the terms indicating directions such as front, rear, left, right, upper and lower directions may be changed depending on the position of an observer or the shape of an object. For the sake of convenience of description, in the present specification, directions are classified into front, rear, left, right, upper and lower directions, based on the F direction.

Figure 4:
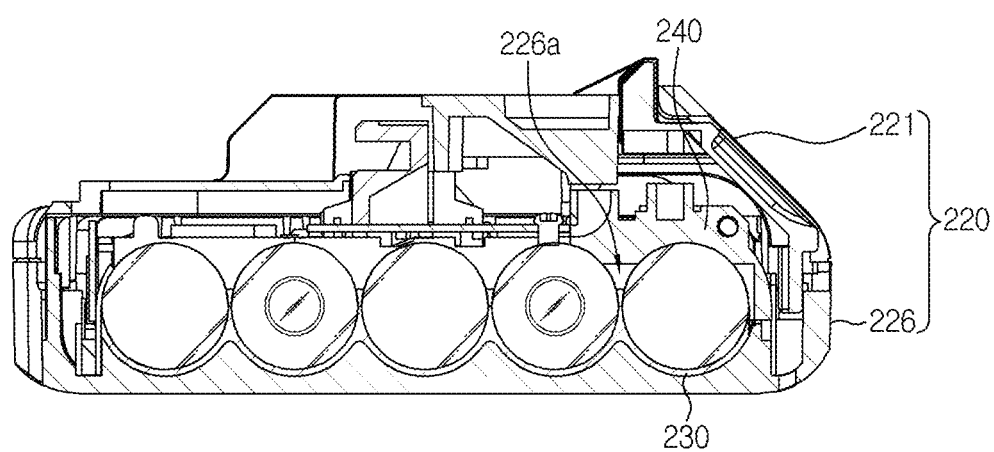
FIG. 4 is a lateral sectioned view schematically showing a side surface of the secondary battery pack, taken along the line C-C' of FIG. 1.

FIG. 4 is a lateral sectioned view schematically showing a side surface of the secondary battery pack, taken along the line C-C' of FIG. 1.

Referring to FIG. 4 along with FIG. 2, the secondary battery pack 200 of the present disclosure may include a thermally conductive resin 230.

Specifically, the thermally conductive resin 230 may be added to be interposed between an inner surface of the pack housing 220 forming the inner space and an outer surface of the plurality of cylindrical battery cells 100. In addition, the thermally conductive resin 230 may be coated to surround at least a lower portion of the outer surface of the plurality of cylindrical battery cells 100 accommodated in the pack housing 220.

Moreover, the thermally conductive resin 230 may be added to make contact with a portion of both ends of the outer surface of the plurality of cylindrical battery cells 100 accommodated in the pack housing 220 in a left and right direction (the x-axis direction of FIG. 2) where the electrode terminals 111 are formed. In addition, the thermally conductive resin 230 may be added to be in contact with the lower inner surface of the lower case 226. For example, as shown in FIG. 4, the thermally conductive resin 230 may be interposed between the lower surface of the battery can 120 of five cylindrical battery cells 100 and the inner surface of the lower case 226.

Thus, according to this configuration of the present disclosure, since the thermally conductive resin 230 is interposed between the plurality of cylindrical battery cells 100 and the inner surface of the pack housing 220, it is possible to effectively transfer the heat generated from the plurality of cylindrical battery cells 100 to the pack housing 220, thereby maximizing the heat dissipation effect of the secondary battery pack 200.

Figure 5:
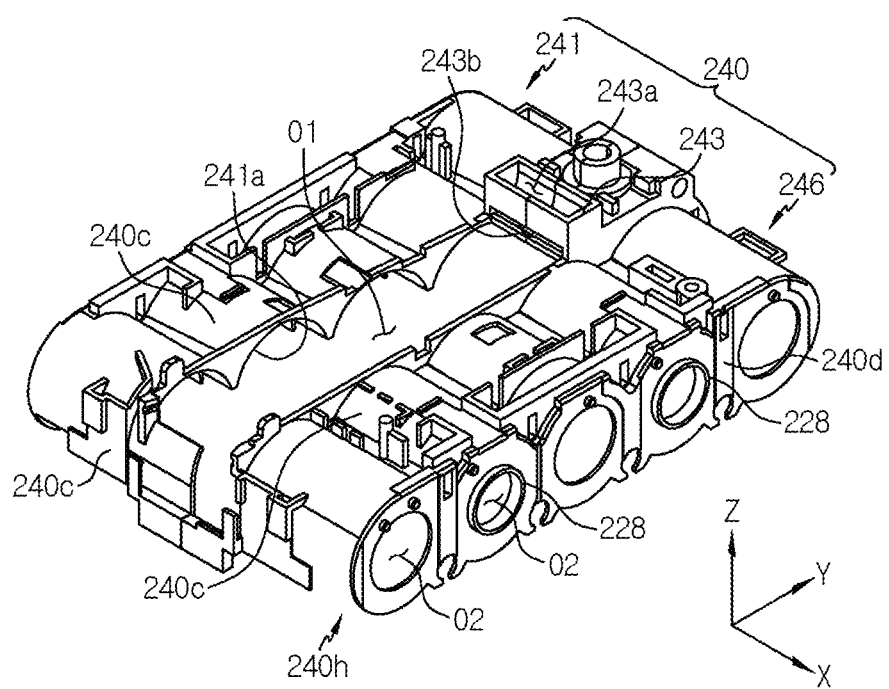
FIG. 5 is perspective views schematically showing some components of secondary battery pack according to an embodiment of the present disclosure at one side.

FIG. 5 is perspective views schematically showing some components of secondary battery pack according to an embodiment of the present disclosure at one side.

Referring to FIG. 5 along with FIG. 2, the cell frame 240 may be formed to surround an upper portion of the plurality of cylindrical battery cells 100.

Specifically, the cell frame 240 may include a first frame 241 and a second frame 246. In addition, the first frame 241 may cover one side (a left side) of the plurality of cylindrical battery cells 100 with respect to the center in the horizontal direction (the x-axis direction). Further, the second frame 246 is coupled to the other side of the first frame 241 and may be configured to cover the other side (a right side) of the plurality of cylindrical battery cells 100 with respect to the center in the horizontal direction (the x-axis direction).

In addition, the cell frame 240 may be formed to surround a part of the upper portion of the plurality of cylindrical battery cells 100. To this end, a bent structure 241a corresponding to the upper outer surface of the plurality of cylindrical battery cells 100 may be formed at an upper inner surface of the cell frame 240.

Also, the cell frame 240 may include a cover portion 240c and an open portion 240h.

More specifically, the cover portion 240c may have an inner surface to surround the upper portion of the plurality of cylindrical battery cells 100 and at least a portion of the horizontal sides of the plurality of cylindrical battery cells 100.

In addition, the open portion 240h may have an open structure such that a lower portion of the plurality of cylindrical battery cells 100 is exposed to the outside.

Further, the upper portion of the cell frame 240 may have an input tube 243 so that the air introduced from the air input portions 125 (FIG. 2) formed at the upper case 221 of the pack housing 220 is easily delivered to the plurality of cylindrical battery cells 100 accommodated in the cell frame 240. Also, the input tube 243 may have a hollow structure extending upward and having an inner hollow. Further, an inlet 243a for introducing air may be formed at an upper end of the input tube 243, and an outlet 243b opened to one side may be formed at a lower portion thereof.

In addition, an exposed portion 01 may be formed at an upper portion of the cell frame 240 to which the first frame 241 and the second frame 246 are coupled, so that the plurality of cylindrical battery cells 100 are exposed to the outside. Also, the exposed portion 01 may be formed in a position adjacent to the outlet 243b of the input tube 243 so as to be connected thereto.

Thus, according to this configuration of the present disclosure, since the input tube 243 and the exposed portion 01 are formed at the upper side of the cell frame 240, it is possible to guide the air introduced from the outside to flow into the cell frame 240. Accordingly, the secondary battery pack 200 may efficiently move an external air to the inside, thereby effectively increasing the cooling efficiency of the secondary battery pack 200.

Figure 6:
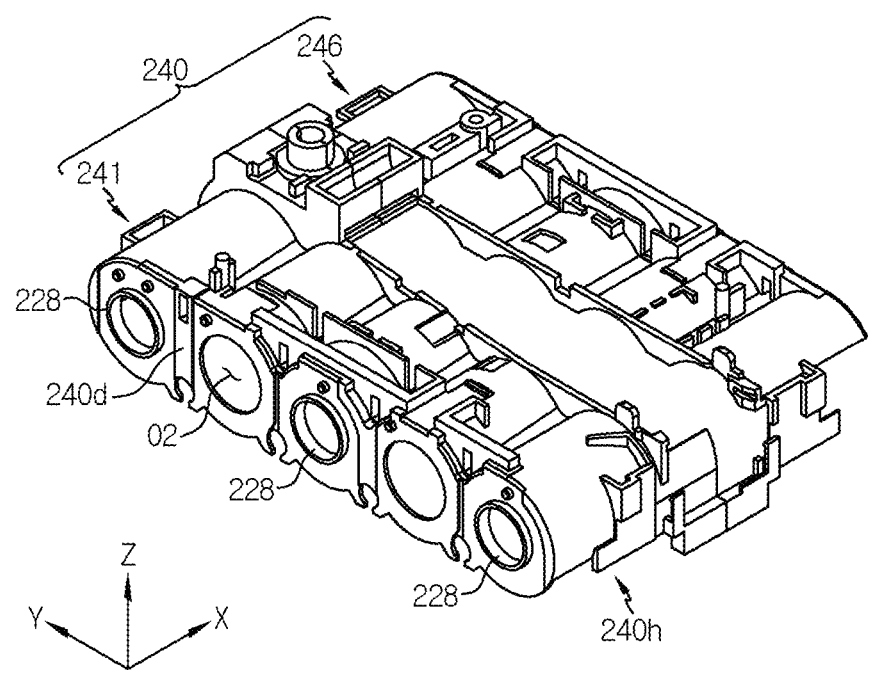
FIG. 6 is perspective views schematically showing some components of secondary battery pack according to an embodiment of the present disclosure at one side.

FIG. 6 is perspective views schematically showing some components of secondary battery pack according to an embodiment of the present disclosure at one side.

Referring to FIG. 6 along with FIG. 2, the cell frame 240 may have a terminal cover 240d configured to cover at least a portion of the outer surfaces of both ends at which the electrode terminals 111 are formed. Specifically, when the plurality of cylindrical battery cells 100 are arranged in the horizontal direction, the terminal cover 240d may surround both ends of the left and right directions (x-axis direction) of the plurality of cylindrical battery cells 100 at which the electrode terminals 111 are formed.

In addition, the terminal cover 240d may extend downward from both ends of the cover portion 240c in the x-axis direction, which covers the upper portion of the cell frame 240. At this time, the terminal cover 240d may surround at least a portion of the electrode terminals 111 of the plurality of cylindrical battery cells 100.

Also, the terminal cover 240d may have an opening 02 to expose the electrode terminal 111 to the outside. At this time, a portion of the connection plate 210 may be in contact with the electrode terminal 111 through the opening 02 of the cell frame 240.

Figure 7:
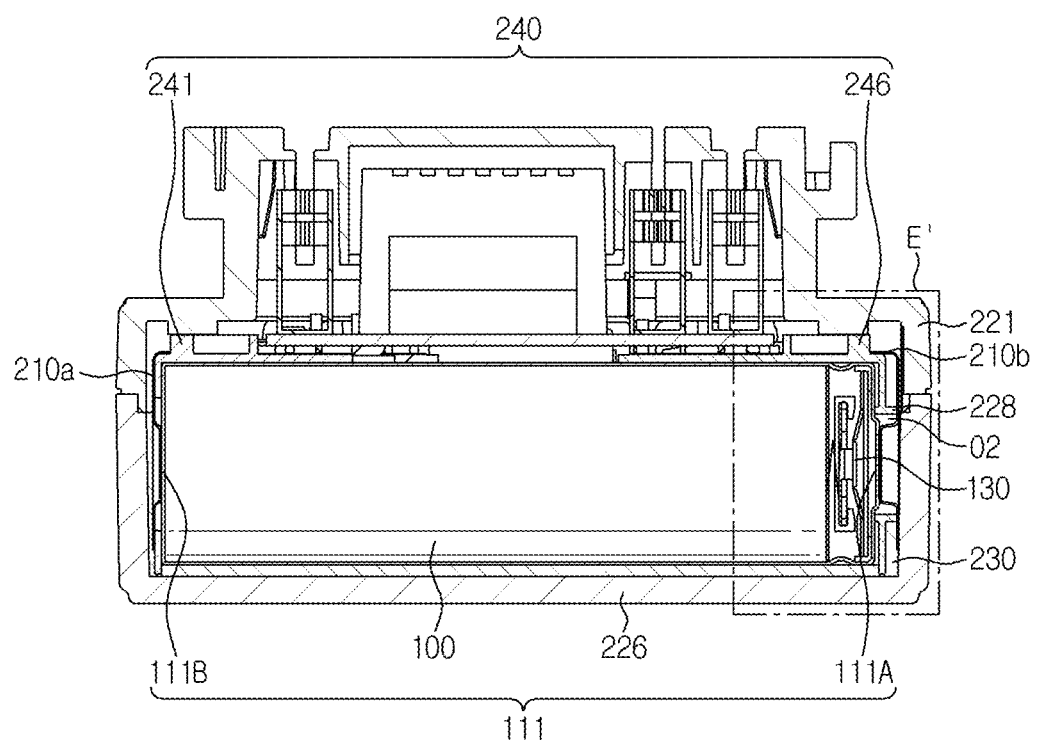
FIG. 7 is a lateral sectioned view schematically showing a side surface of the secondary battery pack, taken along the line, D-D' of FIG. 1.

FIG. 7 is a lateral sectioned view schematically showing a side surface of the secondary battery pack, taken along the line, D-D' of FIG. 1.

Referring to FIG. 7 along with FIGS. 2 and 5, the cell frame 240 may have a coating prevention part 228 formed to protrude outward from at least a portion of a rim of the opening 02 protrudes outward.

Specifically, the cell frame 240 may have a coating prevention part 228 protruding outward to face the inner surface of the pack housing 220. That is, the coating prevention part 228 may protrude to surround a peripheral portion of the electrode terminal 111 of the cylindrical battery cell 100.

For example, as shown in FIGS. 2 and 5, the coating prevention part 228 may have a hollow tubular form extending in the left and right direction (the x-axis direction) from the terminal cover 240d of the cell frame 240.

Referring to FIG. 7 along with FIGS. 3 and 5 again, a safety vent structure 130 for ejecting gas to the outside when the internal gas is generated above a specific internal pressure may be formed at any one of the electrode terminals 111A, 111B formed at both ends of the cylindrical battery cell 100. At this time, the coating prevention part 228 may be formed at a portion of the plurality of cylindrical battery cells 100 that faces the electrode terminal 111A at which the safety vent structure 130 is formed.

For example, as shown in FIG. 2, the plurality of cylindrical battery cells 100 may have a safety vent structure 130 formed at a portion where the first electrode terminal 111A is formed. In addition, two coating prevention parts 228 formed at both ends of the cell frame 240 may be located to face the first electrode terminal 111A of the plurality of cylindrical battery cells 100.

That is, in the case where the thermally conductive resin 230 covers and seals the electrode terminal 111 at which the safety vent structure 130 is formed, if a high-pressure gas is generated, the high-pressure gas generated inside the cylindrical battery cell 100 may not be discharged, which may lead to an accident such as fire or explosion of the battery cell 100.

Thus, according to this configuration of the present disclosure, since the coating prevention part 228 is formed at the cell frame 240 such that thermally conductive resin 230 is not coated to the electrode terminal 111 of the plurality of cylindrical battery cells 100 at which the safety vent structure 130 is formed, it is possible to prevent the thermally conductive resin 230 from being coated to the outer surface of the electrode terminal 111.

Accordingly, in the present disclosure, it is possible to prevent that the safety vent structure 130 does not operate due to the thermally conductive resin 230, thereby effectively increasing the safety of the secondary battery pack 200.

Figure 8:
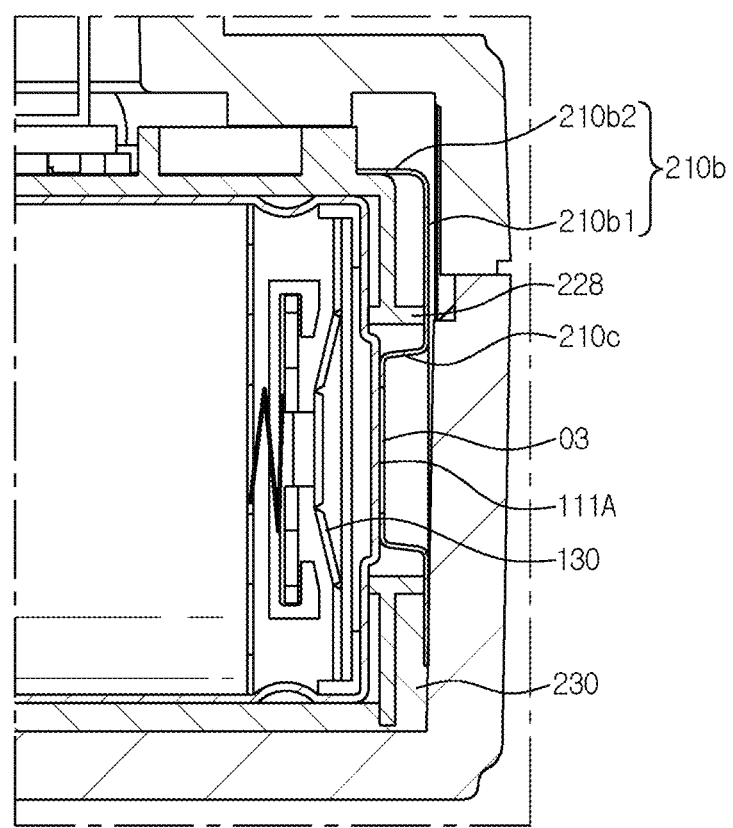
FIG. 8 is a lateral sectioned view schematically showing a part of a portion E' of the secondary battery pack of FIG. 7 in an enlarged form.

FIG. 8 is a lateral sectioned view schematically showing a part of a portion E' of the secondary battery pack of FIG. 7 in an enlarged form.

Referring to FIG. 8 along with FIGS. 2 and 7, a bent structure 210c and an avoiding hole 03 may be formed at the connection plate 210b located at both ends of the electrode terminals 111 of the plurality of cylindrical battery cells 100.

Specifically, the connection plate 210b may have a bent structure 210c in which the connection plate 210b is bent vertically or horizontally along an outer surface of the coating prevention part 228 that protrudes outward. That is, a portion of the body 210b1 of the connection plate 210b may be bent into the inside of the coating prevention part 228 of the cell frame 240.

Moreover, the connection plate 210b may have a bent structure 210c bent vertically or horizontally so that a portion of the body 210b1 is in contact with the electrode terminal 111 of the cylindrical battery cell 100.

In addition, the body 210b1 of the connection plate 210b may have an avoiding hole 03 through which a portion of the electrode terminal 111 is exposed to the outside so as not to disturb that the safety vent structure 130 is opened to the outside. That is, the avoiding hole 03 opens a portion of the body 210b1 of the connection plate 210b so as not to interfere with a portion of the safety vent structure 130 that is opened when a high-pressure gas is generated inside the cylindrical battery cell 100.

For example, as shown in FIG. 8, the connection plate 210b may have the bent structure 210c bent horizontally or downward along the protruding portion of the coating prevention part 228 that protrudes outward. Further, the avoiding hole 03 may be formed in the body 210b1 of the connection plate 210b so that a portion of the electrode terminal 111 is exposed to the outside.

Thus, according to this configuration of the present disclosure, the plurality of cylindrical battery cells 100 may be electrically connected with each other by forming the bent structure 210c shaped corresponding to the coating prevention part at the connection plate 210b. Further, since the avoiding hole 03 is formed so that the safety vent structure 130 formed at the electrode terminal 111 operates normally, it is possible to ensure safety during abnormal operation of the secondary battery pack.

In addition, a portion of the connection plate 210b may be interposed between the coating prevention part 228 of the cell frame 240 and the inner surface of the pack housing 220.

Thus, according to this configuration of the present disclosure, since a portion of the connection plate 210b is interposed between the coating prevention part 228 of the cell frame 240 and the inner surface of the pack housing 220, it is possible to prevent the thermally conductive resin 230 from flowing in. Accordingly, the thermally conductive resin 230 may be guided to be precisely coated to an intended site.

Figure 9:
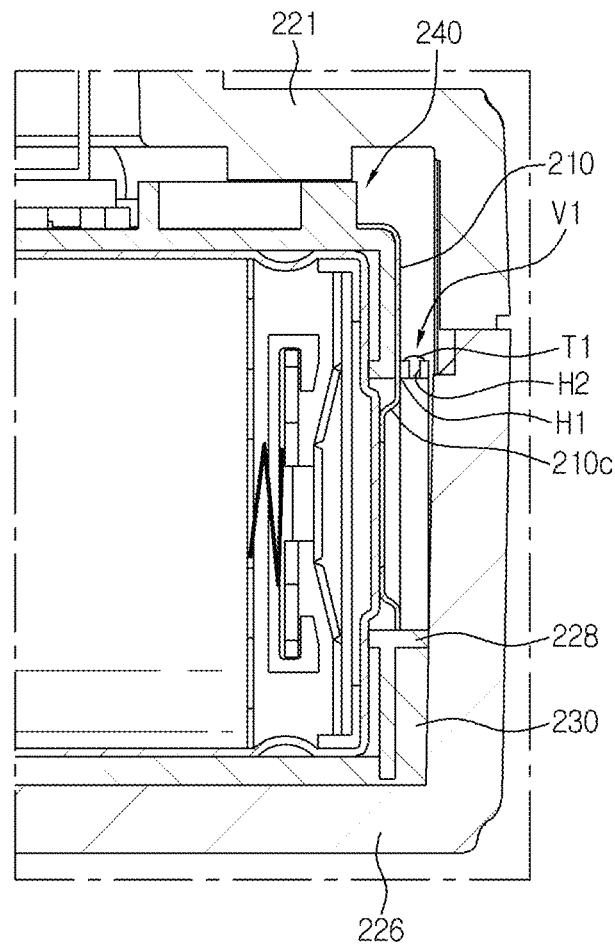
FIG. 9 is a lateral sectioned view schematically showing a part of a side surface of the secondary battery pack according to another embodiment of the present disclosure, taken along one direction.

FIG. 9 is a lateral sectioned view schematically showing a part of a side surface of the secondary battery pack according to another embodiment of the present disclosure, taken along one direction.

Referring to FIG. 9, the secondary battery pack 200 according to another embodiment may have a perforation hole H1 formed in the coating prevention part 228 of the cell frame 240 so that a portion of the connection plate 210 is inserted therein. In addition, the portion of the connection plate 210 configured to contact the electrode terminal 111 of the cylindrical battery cell 100 may be inserted into the perforation hole H1 of the coating prevention part 228. Also, the inserted portion of the connection plate 210 may have a bent structure 210c bent horizontally or downward to contact the electrode terminal 111 of the cylindrical battery cell 100.

For example, as shown in FIG. 9, a portion of the connection plate 210 may be inserted into the perforation hole H1 formed in the coating prevention part 228 and located inside the coating prevention part 228. In addition, the inserted portion of the connection plate 210 may be bent inward to contact the outer surface of the first electrode terminal 111A (FIG. 2) of the cylindrical battery cell 100.

Thus, according to this configuration of the present disclosure, if the perforation hole H1 is formed in the coating prevention part 228 of the cell frame 240 of the present disclosure so that a portion of the connection plate 210 is inserted therein, the connection plate 210 may be firmly fixed to the outer surface of the cell frame 240, and the extended length of the connection plate 210 to contact the electrode terminal 111 may be minimized, thereby reducing the material cost.

Referring to FIG. 9 again, the coating prevention part 228 may have a gas vent structure V1 that is opened to discharge the internal gas of the coating prevention part 228 to the outside when the air pressure in the inner space where the electrode terminal 111 is located is higher than a predetermined value.

Specifically, the gas vent structure V1 may be a notch (not shown) formed at the coating prevention part 228. In addition, the notch may extend inward from a terminal of the coating prevention part 228 that protrudes outward. That is, a notch having a bifurcated shape may be formed at the outer terminal of the coating prevention part 228.

In addition, a gas vent structure V1 of the coating prevention part 228 according to another embodiment may have a perforation hole H2 perforated through the coating prevention part 228 from the outside to the inside thereof and a cap T1 provided to seal the perforation hole H2. At this time, the cap T1 may be configured to be separated upward from the perforation hole H2 when the air pressure inside the coating prevention part 228 is higher than a predetermined value.

Thus, according to this configuration of the present disclosure, since the cell frame 240 of the present disclosure has the gas vent structure V1 formed at the coating prevention part 228, the gas discharged from the plurality of cylindrical battery cells 100 may be discharged to the outside appropriately without stagnating inside the coating prevention part 228. Accordingly, it is possible to prevent that fire or explosion is generated due to the stagnant gas.

Figure 10:
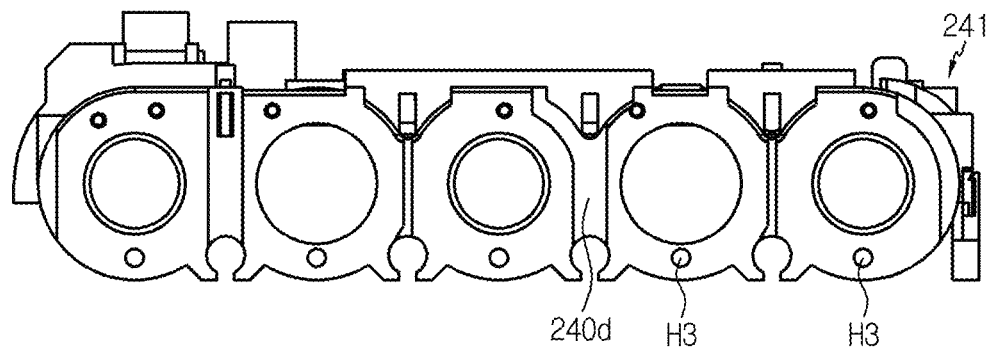
FIG. 10 is a side schematically showing a first frame of a cell frame, employed at a secondary battery pack according to still another embodiment of the present disclosure.
Figure 11:
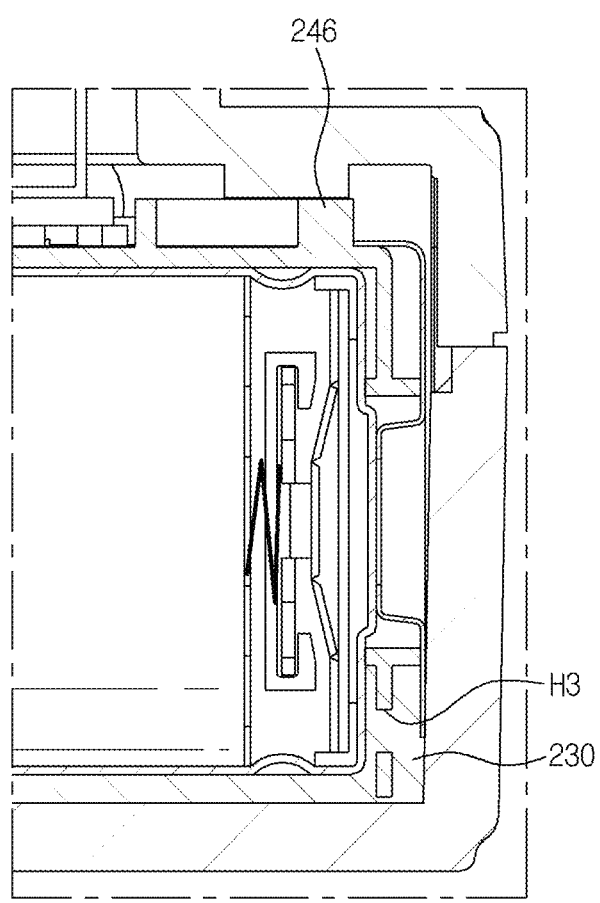
FIG. 11 is a lateral sectioned view schematically showing a part of a side surface of the secondary battery pack according to still another embodiment of the present disclosure, taken along one direction.

FIG. 10 is a side schematically showing a first frame of a cell frame, employed at a secondary battery pack according to still another embodiment of the present disclosure. Also, FIG. 11 is a lateral sectioned view schematically showing a part of a side surface of the secondary battery pack according to still another embodiment of the present disclosure, taken along one direction. Here, FIG. 10 depicts the first frame 241 of the cell frame 240 of the secondary battery pack 200 according to another embodiment of the present disclosure, viewed from the left.

Referring to FIGS. 10 and 11, a fixing hole H3 perforated in the left and right direction may be formed at the terminal cover 240d of the first frame 241 of the cell frame 240 of the secondary battery pack 200. Specifically, the fixing hole H3 may be perforated so that a portion of the thermally conductive resin 230 is introduced and solidified therein. That is, when the thermally conductive resin 230 is added inside the pack housing 220, a part of the thermally conductive resin 230 may be introduced into the fixing hole H3 formed in the cell frame 240 and solidified therein.

For example, as shown in FIG. 10, five fixing holes H3 may be formed in the first frame 241 of the cell frame 240. Also, as shown in FIG. 11, a portion of the thermally conductive resin 230 may be introduced into the fixing holes H3 and solidified therein.

Thus, according to this configuration of the present disclosure, since the fixing hole H3 is formed in the cell frame 240, the coupling force between the thermally conductive resin 230 and the cell frame 240 may be increased. In addition, the thermally conductive resin 230 may increase the binding force among the cell frame 240, the plurality of cylindrical battery cells 100 and the pack housing 220 by means of the fixing hole H3, thereby increasing durability of the secondary battery pack 200.

Referring to FIGS. 1 and 2 again, the upper case 221 of the pack housing 220 may have a slit 51 that is opened to connect the external input/output terminal 252 included inside the pack housing 220 and electrically connected to the battery management unit 250 and the connection terminal (not shown) of the external electronic device.

In addition, the battery management unit 250 may include a data connector 254 for transmitting a data signal to the external electronic device (not shown). Further, in the upper case 221 may have a connection opening 04 that is opened so that a portion of the data connector 254 is exposed out of the upper case 221.

Figure 12:
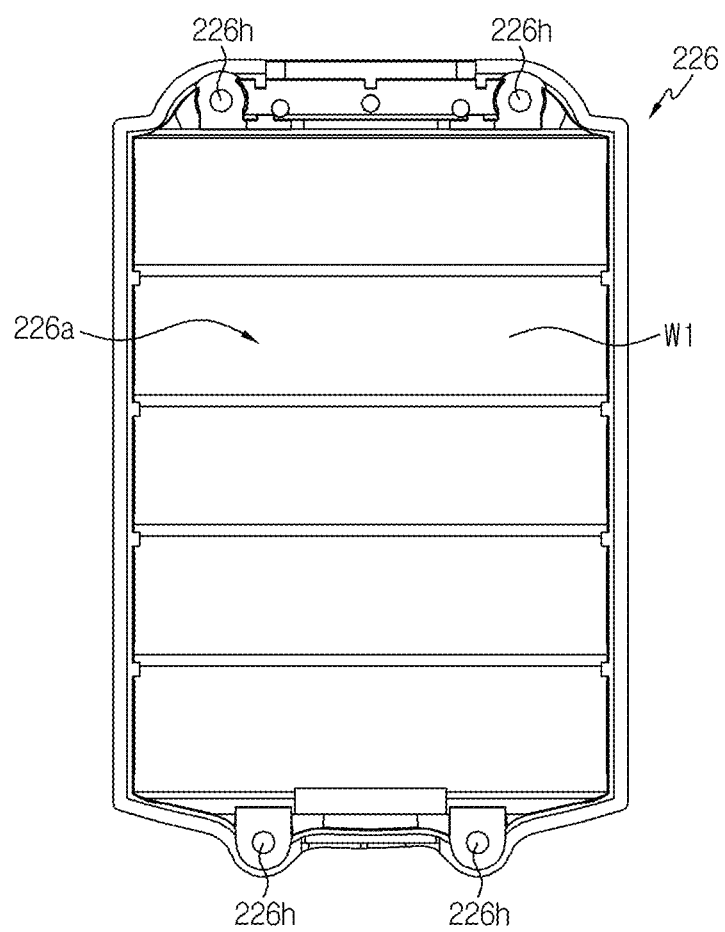
FIG. 12 is a plan view schematically showing a lower case of the secondary battery pack according to an embodiment of the present disclosure.

FIG. 12 is a plan view schematically showing a lower case of the secondary battery pack according to an embodiment of the present disclosure.

Referring to FIG. 12 along with FIG. 2, the lower case 226 may be configured to be coupled with the upper case 221 using a fastening member. Specifically, the lower case 226 may have a plurality of bolt fastening holes 226h for bolting with the upper case 221. Also, the upper case 221 may have bolt insert holes 221h (FIG. 2) formed at positions corresponding to the bolt fastening holes 226h of the lower case 226.

Further, the secondary battery pack 200 may further have a fastening bolt 270. In addition, the fastening bolt 270 may be inserted into and fastened to the fastening hole 226h of the lower case 226 and the bolt insert hole 221h of the upper case 221, respectively.

For example, as shown in FIG. 12, the lower case 226 may have four bolt fastening holes 226h for bolting. In addition, the upper case 221 may have four bolt insert holes 221h for bolting. Further, the four fastening bolts 270 may be inserted into the four bolt fastening holes 226h and the four bolt insert holes 221h, respectively, to couple the upper case 221 and the lower case 226 with each other.

Referring to FIG. 12 again along with FIG. 2, a plurality of concave structures W1 may be formed at the inner side of the accommodation portion 226a of the lower case 226. Specifically, the plurality of concave structures W1 may be concave downward at an inner portion thereof to correspond to the outer surface of the lower portion of the plurality of cylindrical battery cells 100.

For example, as shown in FIG. 12, five concave structures W1 concave to correspond to the outer surfaces of the lower portions of five cylindrical battery cells 100 may be formed at the inner portion of the lower case 226.

Thus, according to this configuration of the present disclosure, since the plurality of concave structures W1 corresponding to the plurality of cylindrical battery cells 100 are formed at the lower case 226, the contact area with the plurality of cylindrical battery cells 100 may be maximized, thereby effectively discharging the heat generated from the plurality of cylindrical battery cells 100 to the outside.

Figure 13:
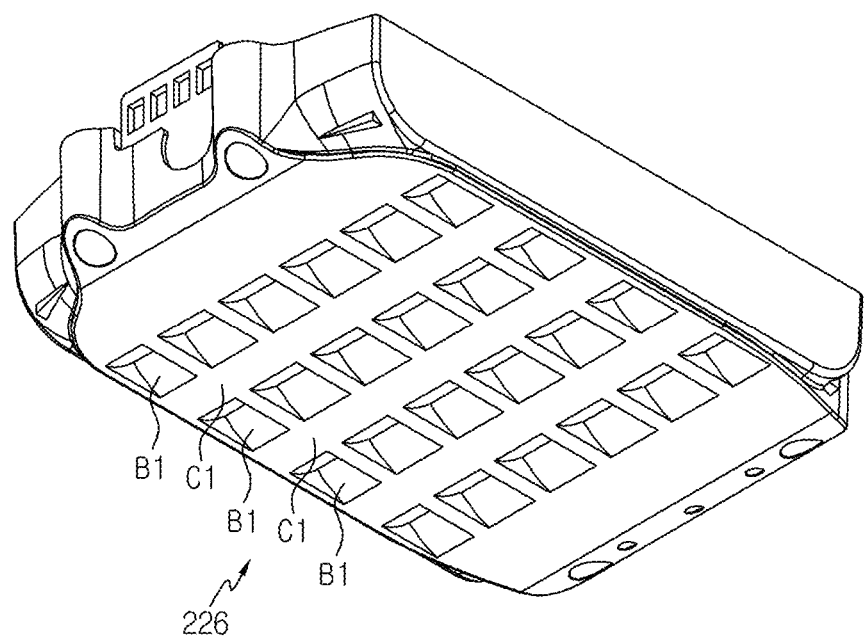
FIG. 13 is a bottom perspective view schematically showing the lower case of the secondary battery pack according to an embodiment of the present disclosure.

In addition, FIG. 13 is a bottom perspective view schematically showing the lower case of the secondary battery pack according to an embodiment of the present disclosure.

Referring to FIG. 13 along with FIGS. 2 and 12, a plurality of convex portions B1 convex outward may be formed in the groove at the outer surface of the lower case 226. Specifically, the plurality of convex portions B1 may be convex outward along the shape of the plurality of concave structures W1 formed at the inner side of the accommodation portion 226a of the lower case 226. That is, the plurality of convex portions B1 may be shaped corresponding to the plurality of concave structures W1 formed at the inner side of the accommodation portion 226a of the lower case 226.

For example, as shown in FIG. 13, five convex portions B1 may be formed in the groove at the outer surface of the lower case 226. In addition, the five convex portions B1 may be shaped corresponding to five concave structures W1 formed at the inner surface of the lower case 226.

Thus, according to this configuration of the present disclosure, since the plurality of convex portions B1 are formed at the inner side of the outer surface of the lower case 226, the heat of the plurality of cylindrical battery cells 100 is absorbed by the concave structure W1 formed at the inner side of the accommodation portion 226a of the lower case 226, and the heat absorbed by the concave structure W1 may be quickly transferred to the plurality of convex portions B1, thereby effectively dissipating the heat through the plurality of convex portions B1 exposed to the external air out of the pack housing 220. Accordingly, it is possible to greatly increase the cooling efficiency of the secondary battery pack 200.

Referring to FIG. 13 again, a lattice portion C1 in which ribs protruding outward (downward) extend vertically and horizontally may be formed at the outer surface of the lower case 226. Specifically, the lattice portion C1 may be formed at the outer surface of the lower case 226 at which the plurality of convex portions B1 are formed.

For example, as shown in FIG. 13, the lattice portion C1 in which ribs are provided in five vertical columns and three horizontal rows intersecting each other may be formed at the outer surface of the lower case 226 where the convex portion B1 is formed.

Thus, according to this configuration of the present disclosure, since the lattice portion C1 is formed at the outer surface of the lower case 226 where the convex portion B1 is formed, the lattice portion C1 may prevent the convex portion B1 of the lower case 226 from colliding with external substances and also effectively improve the mechanical stiffness of the outer portion of the lower case 226 where the convex portion B1 is formed.

In addition, an electronic device (not shown) according to the present disclosure includes the secondary battery pack 200. At this time, the electronic device may be configured to operate by receiving power from the secondary battery pack 200. For example, the electronic device may include a connector (not shown) for connecting to the external input/output terminal 252 (FIG. 2) or the data connector 254 (FIG. 2) of the secondary battery pack 200.

Also, a power tool according to the present disclosure may include the secondary battery pack 200. For example, the power tool may be an electric drill. Further, the secondary battery pack 200 may be coupled to a lower portion of the power tool.

Meanwhile, even though the terms indicating directions such as upper, lower, left, right, front and rear directions are used in the specification, it is obvious to those skilled in the art that these merely represent relative locations for convenience in explanation and may vary based on a location of an observer or an object.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

REFERENCE SIGNS

| | |
|---|---|
| 200: secondary battery pack | |
| 100: cylindrical battery cell | 111: electrode terminal |
| 210: connection plate | 250: battery management unit |
| 210c: bent structure | 03: avoiding hole |
| 220: pack housing | 221: upper case |
| 226: lower case | 228: coating prevention part |
| H1: perforation hole | V1: gas vent structure |
| 230: thermally conductive resin | 240: cell frame |
| 241: first frame | 46: second frame |
| 240c: cover portion | H3: fixing hole |
| B1: convex portion | W1: concave structure |

INDUSTRIAL APPLICABILITY

The present disclosure relates to a secondary battery pack including a cell frame. In addition, the present disclosure is available for industries associated with electronic devices or power tools including the secondary battery pack.

What is claimed is:

1. A secondary battery pack, comprising:
a plurality of cylindrical battery cells arranged in one direction, each cylindrical battery cell having a cylindrical side surface and outer end surfaces at both ends thereof with electrode terminals respectively at the end surfaces of one end and the other end thereof;
a connection plate configured to electrically connect the plurality of cylindrical battery cells with each other;
a pack housing having an inner space in which the plurality of cylindrical battery cells are mounted so that the cylindrical battery cells are disposed in a horizontal direction;
a thermally conductive resin between an inner surface of the pack housing forming the inner space and an outer surface of the plurality of cylindrical battery cells; and
a cell frame configured to surround an upper portion of the plurality of cylindrical battery cells and at least a portion of the end surfaces of both ends of the plurality of cylindrical battery cells at which the electrode terminals are formed, the cell frame having an opening through which the electrode terminals are exposed out, the cell frame having a coating prevention part protruding outward from at least a portion of a rim of the opening to protrude outward in an axial direction of the plurality of cylindrical battery cells away from the plurality of cylindrical battery cells such that the electrode terminals remain exposed out,
wherein the cell frame and the coating prevention part are continuous of a same material.

2. The secondary battery pack according to claim 1, wherein the connection plate has a bent structure bent vertically or horizontally along an outer surface of the coating prevention part that protrudes outward.

3. The secondary battery pack according to claim 1, wherein the coating prevention part has a perforation hole into which a portion of the connection plate is inserted.

4. The secondary battery pack according to claim 1, wherein the coating prevention part has a gas vent structure including a hole and a cap sealing the hole; and
wherein the gas vent structure is opened to discharge an air inside the coating prevention part to the outside when an air pressure of the inner space in which the electrode terminals are located is higher than a predetermined value.

5. The secondary battery pack according to claim 1, wherein the cell frame includes:
a first frame configured to cover one side of the plurality of cylindrical battery cells with respect to a horizontal direction; and
a second frame coupled to the first frame and configured to cover the other side of the plurality of cylindrical battery cells with respect to the horizontal direction,
wherein each of the first frame and the second frame includes:
a cover portion having an inner surface formed to surround the upper portion of the plurality of cylindrical battery cells and at least a portion of horizontal sides of the plurality of cylindrical battery cells; and
an open portion formed therein so that a lower portion of the plurality of cylindrical battery cells is exposed out, and
wherein the thermally conductive resin is coated to surround at least a lower portion of the plurality of cylindrical battery cells, among end surfaces thereof.

6. The secondary battery pack according to claim 5, wherein the first frame and the second frame have a fixing hole so that a portion of the thermally conductive resin is introduced and solidified in the fixing hole.

7. The secondary battery pack according to claim 1, wherein the pack housing includes:
an upper case configured to cover an upper portion of the cell frame; and
a lower case coupled to a lower surface of the upper case and having a plurality of concave structures at the inner space to respectively correspond to outer surfaces of lower portions of the plurality of cylindrical battery cells.

8. The secondary battery pack according to claim 7, wherein a plurality of convex portions protruding outward corresponding to the shape of the plurality of concave structures at the inner portion of the lower case are formed at an outer surface of the lower case.

9. The secondary battery pack according to claim 8, wherein a lattice portion in which ribs protruding outward are formed to extend vertically and horizontally is at the outer surface of the lower case having the plurality of convex portions.

10. An electronic device, comprising the secondary battery pack according to claim 1.

11. A power tool, comprising the secondary battery pack according to claim 1.

12. The secondary battery pack according to claim 1, wherein the coating prevention part protrudes outward from an entire periphery of the rim of the opening.

13. The secondary battery pack according to claim 1, wherein the coating prevention part has a hollow tubular form.

* * * * *